United States Patent
Bartee et al.

(10) Patent No.: US 12,472,281 B2
(45) Date of Patent: Nov. 18, 2025

(54) MULTI-LAYER COLLAGEN-BASED MEMBRANE

(71) Applicant: Osteogenics Biomedical, Inc., Lubbock, TX (US)

(72) Inventors: Barry Bartee, Lubbock, TX (US); Evan Cain, Lubbock, TX (US)

(73) Assignee: Osteogenics Biomedical, Inc., Lubbock, TX (US)

(*) Notice: Subject to any disclaimer, the term of this patent is extended or adjusted under 35 U.S.C. 154(b) by 987 days.

(21) Appl. No.: 17/547,941

(22) Filed: Dec. 10, 2021

(65) Prior Publication Data

US 2022/0184275 A1 Jun. 16, 2022

Related U.S. Application Data

(60) Provisional application No. 63/124,469, filed on Dec. 11, 2020.

(51) Int. Cl.
| | |
|---|---|
| *A61L 27/24* | (2006.01) |
| *A61L 27/16* | (2006.01) |
| *A61L 27/18* | (2006.01) |
| *A61L 27/36* | (2006.01) |
| *A61L 27/40* | (2006.01) |
| *A61L 27/58* | (2006.01) |

(52) U.S. Cl.
CPC ............ *A61L 27/24* (2013.01); *A61L 27/18* (2013.01); *A61L 27/3608* (2013.01); *A61L 27/3695* (2013.01); *A61L 2430/00* (2013.01)

(58) Field of Classification Search
None
See application file for complete search history.

(56) References Cited

U.S. PATENT DOCUMENTS

| | | | |
|---|---|---|---|
| 8,556,990 B2 | 10/2013 | Bartree et al. | |
| 10,238,497 B2 | 3/2019 | Engman | |
| 10,624,747 B2 | 4/2020 | Sonnleitner | |
| 2004/0048796 A1 | 3/2004 | Hariri et al. | |
| 2010/0082113 A1* | 4/2010 | Gingras | A61F 2/0063 623/23.72 |
| 2012/0221118 A1* | 8/2012 | Bartee | A61L 27/54 623/23.72 |
| 2013/0288199 A1 | 10/2013 | Wen | |
| 2014/0052247 A1 | 2/2014 | Daniel et al. | |
| 2014/0067058 A1 | 3/2014 | Koob et al. | |
| 2014/0315847 A1 | 10/2014 | Peck et al. | |
| 2015/0258142 A1 | 9/2015 | Dhanaraj et al. | |
| 2016/0338836 A1 | 11/2016 | Sonnleitner | |
| 2018/0028317 A1 | 2/2018 | Schlachter | |
| 2018/0228938 A1 | 8/2018 | McGuire et al. | |
| 2018/0360585 A1* | 12/2018 | Zhang | A61L 27/16 |

FOREIGN PATENT DOCUMENTS

| | | |
|---|---|---|
| CN | 105999405 A | 10/2016 |
| CN | 108289976 A | 7/2018 |
| EP | 0637452 B1 | 10/1999 |

OTHER PUBLICATIONS

Terri et al., "Mechanisms of Peritoneal Fibrosis: Focus on Immune Cells-Peritoneal Stroma Interactions", Frontiers in Immunology, vol. 12, article 607204; pp. 1-17 (Year: 2021).*

Nakanishi et al., "Tissue-Engineered Urinary Bladder Wall Using PLGA Mesh-Collagen Hybrid Scaffolds: A Comparison Study of Collagen Sponge and Gel as a Scaffold", Journal of Pediatric Surgery 2003, vol. 38; pp. 1781-1784 (Year: 2003).*

Majzoub et al., "Guided bone regeneration using demineralized laminar bone sheets versus GTAM membranes in the treatment of implant-associated defects", Clinical Oral Implants Research, vol. 10; pp. 406-414 (Year: 1999).*

Behl et al. "Shape-memory polymers", Materials Today, vol. 10; pp. 20-28 (Year: 2007).*

Gentile et al., "An Overview of Poly(lactic-co-glycolic) Acid (PLGA)-Based Biomaterials for Bone Tissue Engineering", International Journal of Molecular Sciences, vol. 15; pp. 3640-3659 (Year: 2014).*

Louis, et al., "Reconstruction of the Maxilla and Mandible with Particulate Bone Graft and Titanium Mesh for Implant Placement," Journal of Oral and Maxillofacial Surgery, 66(2): 235-245 (2008).

* cited by examiner

*Primary Examiner* — Michelle F. Paguio Frising
(74) *Attorney, Agent, or Firm* — Morse, Barnes-Brown & Pendleton, P.C.; Russell L. Widom

(57) ABSTRACT

A multi-layer collagen-based membrane that includes a bioresorbable mesh embedded between a first decellularized natural collagen-based membrane and a second decellularized natural collagen-based membrane. The bioresorbable mesh can be formed of a synthetic polymer or demineralized laminar bone. Also provided are two methods for manufacturing a multi-layer collagen-based membrane with or without an embedded bioresorbable mesh.

9 Claims, 2 Drawing Sheets

MULTI-LAYER COLLAGEN-BASED MEMBRANE

CROSS-REFERENCE TO RELATED APPLICATIONS

The present application claims the benefit of U.S. Provisional Patent Application Ser. No. 63/124,469 filed on Dec. 11, 2020, the content of which is hereby incorporated by reference in its entirety.

BACKGROUND

Collagen is widely used as a biomaterial in the field of surgery, and there is a long history of its use in the specific discipline of tissue regeneration. For example, U.S. Pat. Nos. 5,206,028 and 5,837,278 each describe a single layer collagen device for tissue regeneration. Collagen devices may be engineered and formed out of reconstituted collagen. Alternatively, they may be naturally derived, i.e., manufactured from tissues harvested in their natural state and processed for use as a biomaterial without significant change in the physical dimension of the tissues. One disadvantage of collagen devices derived from natural tissues is that the thickness and overall size of the final device is dictated by the target tissue. Therefore, strategies to modify the thickness and size have been developed. See U.S. Pat. Nos. 5,955,110 and 5,885,619.

Reinforcement is another strategy to modify the physicomechanical characteristics of collagen devices. By combining a second biomaterial with collagen, the strength or handling characteristics of the device can be modified while maintaining the biological benefits of collagen. For example, US Patent Application Publication 2014/0067058 describes layering collagen and a second biocompatible mesh by stacking, compressing, and drying.

In clinical tissue regeneration procedures, especially in the maxillofacial region where there is substantial movement of host tissues during the healing phase, stability is required for predicable healing. Delamination of any laminated device typically creates dead space within the wound which can contribute to infection and failure of the procedure. Delamination can also lead to loss of stability of the reinforcing component, leading to compliance issues that could result in tissue perforation and damage. Therefore, stability and longevity of the lamination is of utmost importance in laminated devices.

There are advantages in using naturally derived collagen membranes in a wide variety of hard and soft tissue regeneration procedures. The inherent limitations of the source tissues however, namely thickness, handling properties, and overall size, may require modification to achieve the ideal configuration for clinical use. It would be advantageous to have the ability to link several collagen sheets together, to modify their overall thickness, or to laminate them with intervening components between sheets. Further, the strength of the lamination should be adequate to withstand delamination when wet with biological fluids for an adequate amount of time to achieve clinical success.

The need exists for collagen-based membranes having multiple layers that do not suffer from the drawbacks mentioned above.

SUMMARY

To meet this need, a multi-layer collagen-based membrane is provided that includes a bioresorbable mesh embedded between a first decellularized natural collagen-based membrane and a second decellularized natural collagen-based membrane. The first and second decellularized natural collagen-based membranes are cross-linked to each other and the multi-layer collagen-based membrane has a peel strength at 90° of 5-250 N/m.

Also provided is a method for manufacturing a multi-layer collagen-based membrane. The method is carried out by obtaining a first and second decellularized natural collagen-containing membrane, placing the second decellularized natural collagen-containing membrane atop the first decellularized natural collagen-containing membrane to form a membrane assembly, drying the membrane assembly under a weight distributed uniformly across the membrane assembly, the weight including openings for allowing moisture to escape, and exposing the membrane assembly to a cross-linking agent such that cross-links form between layers of the membrane assembly. Each of the layers of the multi-layer collagen-based membrane is resorbed at essentially the same rate upon implantation in vivo and no adhesives are employed in the process.

A second method for manufacturing a multi-layer collagen-based membrane is also disclosed. This method includes the steps of obtaining a first and second dried decellularized natural collagen-containing membrane, obtaining a bioresorbable synthetic polymer mesh, placing the bioresorbable synthetic polymer mesh atop the first dried decellularized natural collagen-containing membrane, hydrating the first dried decellularized natural collagen-containing membrane to form a first hydrated membrane, placing the second dried decellularized natural collagen-containing membrane atop the bioresorbable synthetic polymer mesh such that the second dried decellularized natural collagen-containing membrane becomes hydrated by drawing moisture from the first hydrated membrane, drying the membrane mesh assembly under a weight distributed uniformly across the membrane mesh assembly, and exposing the dried membrane mesh assembly to a cross-linking agent such that cross-links form between layers of the membrane mesh assembly. This second method, like the first method, forms a multi-layer collagen-based membrane in which each of the layers is resorbed at essentially the same rate in vivo, the bioresorbable synthetic polymer mesh affords a shape memory to the multi-layer collagen-based membrane, and no adhesives are employed in the process.

The details of one or more embodiments are set forth in the description and the examples below. Other features, objects, and advantages will be apparent from the detailed description, from the drawings, and also from the appended claims.

BRIEF DESCRIPTION OF THE DRAWINGS

The description below refers to the accompanying drawings, of which.

DETAILED DESCRIPTION

Figure 1:
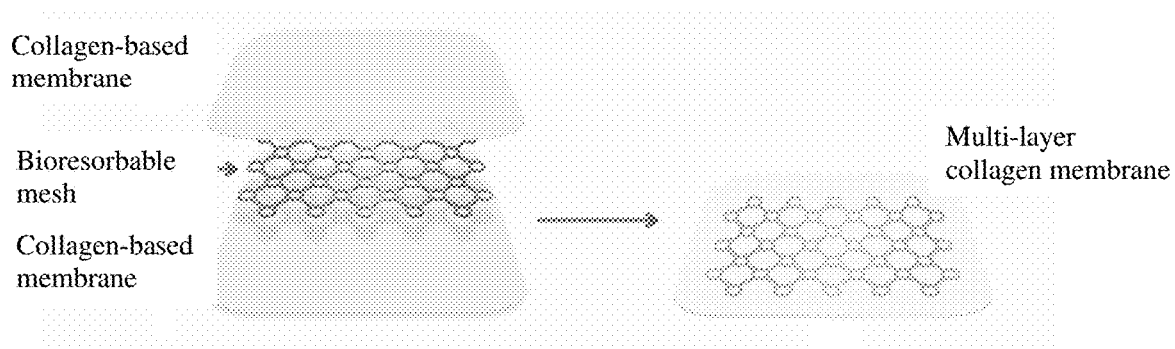
FIG. 1 is a diagram of a multi-layer collagen-based membrane of the invention.
Figure 2:
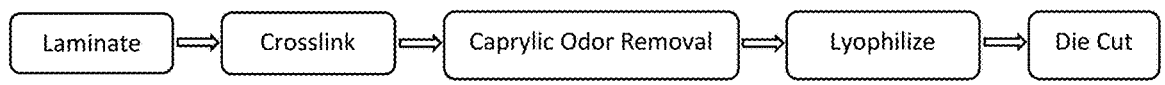
FIG. 2 is a flow chart of a manufacturing process for making the multi-layer collagen-based membrane.
Figure 3:
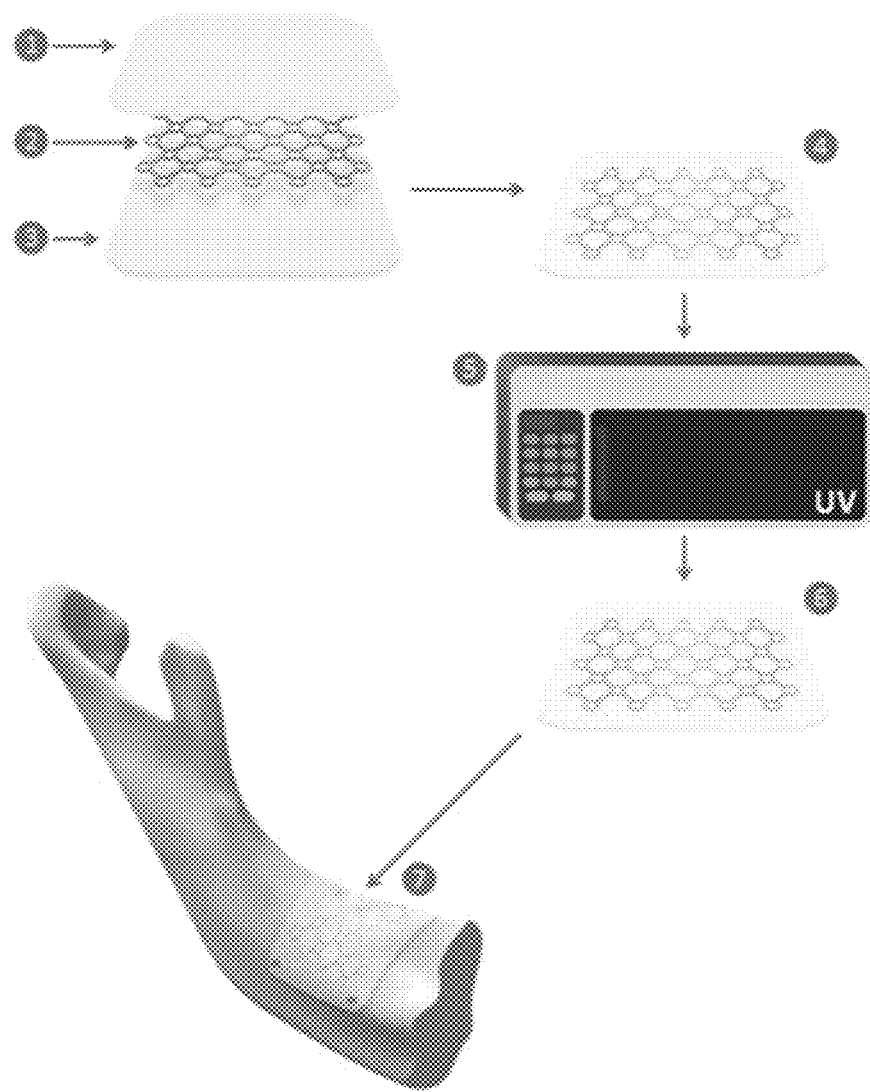
FIG. 3 shows an exemplary method of preparation and clinical use for the multi-layer collagen-based membrane of the invention. 1, 3=collagen-based membrane; 2=bioresorbable mesh; 4=multi-layer collagen membrane assembly; 5=ultraviolet cross-linking apparatus; 6=finished multi-layer collagen-based membrane; 7=finished multi-layer collagen-based membrane used to cover a forearm wound

As summarized above, the multi-layer collagen-based membrane of the invention includes a bioresorbable mesh embedded between a first decellularized natural collagen-based membrane and a second decellularized natural collagen-based membrane. The bioresorbable mesh, in an exemplary multi-layer collagen-based membrane, does not extend to the edges of the multi-layer collagen-based membrane, leaving a border around the edges that is free of the bioresorbable mesh.

The bioresorbable mesh can be formed of laminar bone that has been demineralized. The laminar bone can be from a mammal, e.g., human, bovine, ovine, equine, and porcine. The demineralized laminar bone is in the form of a mesh formed, for example, by die-cutting or laser cutting.

In an alternative multi-layer collagen-based membrane, the bioresorbable mesh is a synthetic polymer mesh that bestows a shape memory on the multi-layer collagen-based membrane. The synthetic polymer mesh can be formed of a homo-polymer including, but not limited to, polylactide ("PLA"), polyglycolide ("PGA"), polycaprolactone ("PCL"), and trimethylene carbonate ("PTMC"). Alternatively, the synthetic polymer mesh can be formed of a co-polymer of monomers included in the above-mentioned polymers, e.g., poly(lactic-co-glycolic acid) ("PLGA") and poly(lactide-co-ε-caprolactone) ("PLCL"). In certain embodiments, specific enantiomers can be used in the homo-polymer or co-polymer. For example, polymers such as poly(L-lactide) ("PLLA"), poly(D-lactide)("PDLA"), or poly(DL-lactide)("PDLLA") can be used in the synthetic polymer mesh.

The synthetic polymer mesh can be manufactured by, e.g., laser cutting, die cutting, compression molding, 3D printing, and extrusion.

An exemplary multi-layer collagen-based membrane has a synthetic polymer mesh formed of PLGA having a lactic acid to glycolic acid monomer ratio of 25:75 to 75:25. In a specific multi-layer collagen-based membrane, the lactic acid to glycolic acid monomer ratio is 50:50. In another example, the multi-layer collagen-based membrane has a synthetic polymer mesh formed of PLCL at a 70:30 ratio of lactic acid monomer to caprolactone monomer.

In certain multi-layer collagen-based membranes, the synthetic polymer mesh also contains a calcium mineral. The calcium mineral can be, but is not limited to, calcium phosphate, β-tricalcium phosphate, calcium sulfate, hydroxyapatite, and calcium apatite derived from natural bone mineral. The calcium mineral can contain additives such as fluorine (e.g., fluorapatite) and magnesium In other multi-layer collagen-based membranes, the synthetic polymer mesh contains a recombinant growth factor, e.g., rhPDGF-BB, rhBMP-2, and FGF. Alternatively or together, pharmaceuticals such as antibiotics and anti-inflammatory agents can be included in the synthetic polymer mesh.

As described above, the multi-layer collagen-based membrane includes a first decellularized natural collagen-based membrane and a second decellularized natural collagen-based membrane. The first decellularized natural collagen-containing membrane, the second decellularized natural collagen-containing membrane, or both, are derived from natural pericardium membranes and have a fibrous side and a serosal side. Preferably, the decellularized natural collagen-containing membranes are derived from parietal pericardium of a mammal, e.g., human, bovine, ovine, equine, and porcine. More preferably, the decellularized natural collagen-containing membranes are derived from porcine parietal pericardium.

In the multi-layer collagen-based membrane of the invention, the fibrous side of the first decellularized natural collagen-containing membrane can be in contact with and cross-linked to (i) the fibrous side of the second decellularized natural collagen-containing membrane or (ii) the serosal side of the second decellularized natural collagen-containing membrane.

In an alternative multi-layer collagen-based membrane, the serosal side of the first decellularized natural collagen-containing membrane can be in contact with and cross-linked to (i) the fibrous side of the second decellularized natural collagen-containing membrane or (ii) the serosal side of the second decellularized natural collagen-containing membrane.

The multi-layer collagen-based membrane of the invention can have a dry peel strength at 90° of 5-250 N/m, e.g., 5-250, 10-250, 20-250, 30-250, 40-250, and 50-250 N/m. The peel strength is not uniform across the entire multi-layer collagen-based membrane. As described above, in certain examples, the bioresorbable mesh does not extend to the edges of the multi-layer collagen-based membrane. These edges, which are free of the bioresorbable mesh, have the strongest dry peel strength, i.e., 50-250 N/m, while areas of the multi-layer collagen-based membrane that include the bioresorbable mesh have variable peel strengths, e.g., 5-250 N/m, depending upon the geometry of the mesh, e.g., mesh size.

Also summarized above are two methods for manufacturing a multi-layer collagen-based membrane.

The first method is carried out by (i) obtaining a first and a second decellularized natural collagen-containing membrane, (ii) placing the second decellularized natural collagen-containing membrane atop the first decellularized natural collagen-containing membrane to form a membrane assembly, (iii) drying the membrane assembly under a weight distributed uniformly across the membrane assembly, and (iv) exposing the membrane assembly to a cross-linking agent such that cross-links form between layers of the membrane assembly.

The first and second decellularized natural collagen-containing membranes are derived from natural pericardium membranes and have a fibrous side and a serosal side. Preferably, the decellularized natural collagen-containing membranes are derived from parietal pericardium of a mammal, e.g., human, bovine, ovine, equine, and porcine. More preferably, the decellularized natural collagen-containing membranes are derived from porcine parietal pericardium.

In an exemplary method, the fibrous side of the first decellularized natural collagen-containing membrane is placed in contact with the fibrous side of the second decellularized natural collagen-containing membrane to form a membrane assembly. Alternatively, the serosal side of the first decellularized natural collagen-containing membrane is placed in contact with the fibrous side of the second decellularized natural collagen-containing membrane to form the membrane assembly. In another example, the serosal side of the first decellularized natural collagen-containing membrane is placed in contact with the serosal side of the second decellularized natural collagen-containing membrane to form the membrane assembly.

In a particular method, a collagen gel is applied to one or both of the two decellularized natural collagen-containing membranes before placing them in contact with each other. In this method, the decellularized natural collagen-containing membranes are first dried briefly to remove excess moisture before application of the collagen gel.

The collagen gel can be prepared from human, bovine, ovine, equine, or porcine pericardium by decellularizing the tissue, followed by hydrolyzing and micronizing the collagen. The concentration of collagen in the gel can be from 2.5 mg/mL to 10.0 mg/mL. Preferably, the concentration is 10 mg/mL.

Not to be bound by theory, it is believed that a collagen gel aids in assembly and lamination of decellularized natural collagen-containing membranes by means of increasing collagen surface area contact between the membrane layers.

The membrane assembly, after the drying step, is subjected to an exposing step in which it is exposed to a cross-linking agent such that cross-links form between layers of the membrane assembly. The cross-linking agent can be, e.g., a chemical cross-linking agent, ultraviolet ("UV") radiation, a cross-linking enzyme, and plastic compression.

Chemical cross-linkers that can be used include, but are not limited to, glutaraldehyde or glutaraldehyde vapor, formaldehyde or formaldehyde vapor, reducing sugars such as ribose and glucose, genipin, a carbodiimide, e.g., N-(3-dimethyl aminopropyl)-N'-ethylcarbodiimide and N-hydroxysuccinimide, dialdehyde starch, riboflavin with UVA radiation, an imidoester, e.g., dimethyl suberimidate, dimethyl adipimidate, dimethyl primelimidate, and dimethyl dithiobispropionimidate, acyl azide, and 4-arm polyethylene glycol succinimidyl glutarate.

Cross-linking can also be carried out enzymatically, for example, using transglutaminase or lysyl oxidase.

Finally, cross-linking can be carried out in conjunction with plastic compression where collagen fibers are aligned by applying a physical force to the fibers in a single direction prior to being exposed to a cross-linking agent.

When UV radiation is used as the cross-linking agent, the exposing step is accomplished by irradiating the top side and the bottom side of the dried membrane assembly with UV radiation at a total energy level of 1,200 to 216,000 mJ/m$^2$ for 1 to 210 min. In an exemplary method, the UV radiation has an energy level of 12,000 to 48,000 mJ/m$^2$ and the exposure time is 10 to 40 minutes.

In certain methods of the invention in which UV radiation is the cross-linking agent, no chemical cross-linking agents are employed in the exposing step.

In a particular example, after the exposing step, a step of removing odorant compounds produced by the UV radiation is included. Odorant compounds that can be removed are volatile degradation and oxidation bi-products of fatty acids, amino acids, and peptides. These compounds can be, but are not limited to, 2-methyl butanal, 3-methyl butanal, 1-heptene, 1-octene, 1-nonene, hydrogen sulfide, sulfur dioxide, mercaptomethane, dimethyl sulfide, methyl thioacetate, dimethyl disulfide, and dimethyl trisulfide.

The removing step can be accomplished, e.g., by rinsing the membrane assembly with $H_2O$ and/or shaking the membrane assembly in an $H_2O$ bath one or more times, e.g., once, twice, three, and four times. Prior to rinsing with $H_2O$, the membrane assembly can be rinsed with a buffer, for example phosphate buffered saline ("PBS").

The method can also include a final drying step. The drying can be accomplished by air drying or by drying under vacuum. The drying can be done at 5° C. to 45° C., preferably at room temperature, for 60 min. to 300 min. If drying under vacuum, the vacuum should be 50 mTorr to 500 mTorr.

In certain embodiments, the method also includes a step of placing a bioresorbable mesh onto the first decellularized natural collagen-containing membrane before placing the second decellularized natural collagen-containing membrane atop the first decellularized natural collagen-containing membrane.

The bioresorbable mesh has been described above in detail. It can be a synthetic polymer mesh formed of, e.g., PLA, PGA, PCL, PTMC, PLLA, PDLA, PDLLA, PLGA, PLCL or a mixture of these polymers having the monomer ratios set forth, supra.

An additional step of adding a calcium-mineral, e.g., calcium phosphate, calcium sulfate, and hydroxyapatite, to the polymers can be part of the method. The calcium-mineral can be added, e.g., by soaking the polymers in a calcium-mineral solution.

Alternatively, the bioresorbable mesh can be formed of demineralized laminar bone as described above.

A second method for manufacturing a multi-layer collagen-based membrane is also summarized above. This process is carried out by (i) obtaining a first dried decellularized natural collagen-containing membrane, (ii) obtaining a bioresorbable synthetic polymer mesh, (iii) placing the bioresorbable synthetic polymer mesh atop the first dried decellularized natural collagen-containing membrane, (iv) hydrating the first dried decellularized natural collagen-containing membrane to form a first hydrated membrane, (v) obtaining a second dried decellularized natural collagen-containing membrane, (vi) placing the second dried decellularized natural collagen-containing membrane atop the bioresorbable synthetic polymer mesh such that the second dried decellularized natural collagen-containing membrane becomes hydrated by drawing moisture from the first hydrated membrane, (vii) drying the membrane mesh assembly under a weight distributed uniformly across the membrane mesh assembly, and (viii) exposing the dried membrane mesh assembly to a cross-linking agent such that cross-links form between layers of the membrane mesh assembly. This second method, like the first method, forms a multi-layer collagen-based membrane in which each of the layers is resorbed at essentially the same rate in vivo, the bioresorbable synthetic polymer mesh affords a shape memory to the multi-layer collagen-based membrane, and no adhesives are employed in the process.

The first and second decellularized natural collagen-containing membranes are as described above for the first method, as is the synthetic bioresorbable polymer mesh. The second method, also like the first method, can employ an exposing step in which the dried membrane mesh assembly is exposed to UV radiation at the intensities and times set out above. The membrane mesh assembly formed by the second method can also be subjected to removing and drying steps included in the first method. In a particular example of the second method in which UV radiation is the cross-linking agent, no chemical cross-linking agents are employed in the exposing step.

The hydrating step can be carried out by applying $H_2O$ onto the first dried decellularized natural collagen-containing membrane.

As an alternative, hydration can be accomplished by applying to the first dried decellularized natural collagen-containing membrane the collagen gel described above. Again, the collagen gel, prepared from human, bovine, ovine, equine, or porcine pericardium, can have a collagen concentration of 2.5 mg/mL to 10.0 mg/mL.

The instant invention encompasses variations of the above two methods for manufacturing a multi-layer collagen-based membrane in which cross-linking is achieved by means in addition to or other than exposure to a chemical cross-linking agent, to UV radiation, or to a cross-linking enzyme. For example, the drying step in the first and second methods can be carried out such that dehydrothermal cross-linking occurs between collagen-containing membranes in the membrane mesh assembly. In certain methods, dehydrothermal cross-linking is employed in the absence of exposure to UV radiation.

Without further elaboration, it is believed that one skilled in the art can, based on the disclosure herein, utilize the present disclosure to its fullest extent. The following specific examples are, therefore, to be construed as merely descriptive, and not limitative of the remainder of the disclosure in any way whatsoever. All publications and patent documents cited herein are incorporated by reference in their entirety.

EXAMPLES

Example 1

Process for Manufacturing a Multi-Layer Collagen-Based Membrane

Layer Assembly

A resorbable polymer mesh with a thickness of 0.22 mm (0.0085 in.) formed of co-polymer PLGA (monomer ratio of lactic acid to glycolic acid of 50:50 or 70:30) was laid atop one lyophilized porcine pericardium membrane. A sufficient quantity of reverse-osmosis deionized $H_2O$ was applied to the membrane until it became clear. A second lyophilized porcine pericardium membrane was placed with its fibrous side on top of the fibrous side of the first hydrated porcine pericardium membrane so that the second membrane pulled $H_2O$ from the first membrane to become hydrated. Additional $H_2O$ was added to any remaining white areas that were not sufficiently hydrated.

Starting from the middle of the membrane, pressure was applied to remove excess $H_2O$ from both membranes. As excess $H_2O$ was removed, the membranes suctioned together firmly.

Care was taken to avoid excessively wetting the membranes to the point that $H_2O$ pooled around them. The integrity of the interface between the membranes has an effect on the clarity and visual uniformity of the finished multi-layer collagen-based membrane. Areas with excess $H_2O$ between the membranes may not fully dry as the $H_2O$ evaporates away. These areas may appear white or hazy upon drying. Of note, the amount of pressure applied when pressing $H_2O$ out of the membranes can have an effect on the dried thickness of the device.

The assembled pericardium layers were left to dry under a uniform flat weight. The weight contained holes in the form of a grate to allow the assembled pericardium layers to dry quickly. The assembled pericardium layers have a propensity to curl or wrinkle when dried in open air. Drying under a weighted grate allows the membranes to dry flat and helps keep the membrane sheets in contact.

It was also found that the layered membranes will maintain some degree of memory of the shape it was dried in. Additionally, it was found that drying under a weighted grate was unexpectedly superior to drying by pressing the membranes with a silicone matting material for up to 24 h, a process that did not allow the pericardium layers to dry sufficiently to reduce bioburden upon implantation to an acceptable level.

Crosslinking

The dried assembled membranes were placed in an ultraviolet light chamber to be crosslinked. Crosslinking of the assembled membranes is essential to prevent delamination once the multi-layer collagen-based membrane comes into contact with $H_2O$ during use.

The membrane assembly was placed 6 inches from a 75 watt bulb source of 254 nm light, i.e., UV radiation, for 15 min. The membrane assembly was then flipped over and exposed for an additional 15 min. to the same level of UV radiation on the other side. This exposure duration delivers a functional amount of energy at the membrane surface of approximately 14,000-22,000 $mJ/cm^2$.

Not to be bound by theory, it is believed that the UV radiation penetrates into the interior of the membrane assembly. Flipping the membrane assembly is performed to make the crosslinking process as uniform as possible.

It should be noted that adequate crosslinking is attainable at treatment times less than 15 min. per side. Under the above conditions this treatment time provides the maximum amount of UV exposure that promotes crosslinking while minimizing degradation.

Importantly, UV radiation was used for crosslinking instead of more common methods such as chemical and dehydrothermal crosslinking. UV radiation is advantageous as it avoids contamination with residual chemical crosslinkers and also avoids denaturation seen in dehydrothermal crosslinking. Moreover, UV radiation is a novel method to control and/or extend the resorption time of collagen based membranes.

Of note, a dedicated regulated 110V power supply between the power source and the crosslinker crosslinking unit likely results in a more uniform repeatable output from the UV-bulbs. This is due to regulation of variations in the power supplied from the electrical grid.

Removal of Unwanted Odor

UV radiation in the crosslinking process liberates compounds in the pericardium that have a strong off-putting caprylic acid-like odor. These compounds are polar and can be removed with multiple successive washes with $H_2O$. Fresh $H_2O$ was run over the membrane assembly for 30 s, after which it was placed in a tray with 1 L of $H_2O$ and shaken on an orbital shaker for 15-20 min. The membrane assembly was washed again with fresh $H_2O$ for 30 s.

The washed membrane assembly was placed on a clean silicone surface and the edges tacked down with a sufficient number of clean stainless steel tacks such that the membrane assembly was taught and flat. The membrane assembly was left to air dry completely.

Vacuum Drying

The membrane assembly was placed in a vacuum dryer and dried at 18° C. for 300 min. at 50 mTorr.

It is known that moisture can contribute to the degradation of the PLGA co-polymer frame. This drying step preserves the shelf-life of the PLGA frame, as well as minimizes the amount $H_2O$ in the device for the purpose of lowering bioburden.

Die Cutting

The multi-layer collagen-based membrane was assembled with pericardium layers slightly larger than the desired dimensions of the finished product. By die-cutting, the polymer mesh can be centered in the finished product by choosing where the die is placed. The cutting edge of the die should be mounted on a clear surface so that the polymer mesh in the device can be seen during this process.

Die cutting the product at this stage also gives the multi-layer collagen-based membrane a clean neat straight edge, as the edges of original pericardium cannot be perfectly aligned during assembly.

When die cutting the multi-layer collagen-based membrane, it should be flipped in an orientation where the die is pressed in the direction opposite of any natural curl in the membranes. This is done to counteract the curl and give the multi-layer collagen-based membrane as flat an appearance as possible.

Sterilization

The multi-layer collagen-based membrane was sterilized by ethylene oxide ("EO").

The sterilization cycle should operate with the minimal amount of heat and moisture required to sterilize the multi-layer collagen-based membrane for the following reasons. First, moisture from the EO cycle will likely remain in the polymer mesh thereby shortening the shelf-life. Second, heat degrades the polymer mesh, also shortening the shelf-life. Third, excessive heat can melt and possibly deform or change the structural integrity of the polymer mesh. Finally, excessive moisture can cause the collagen in the multi-layer collagen-based membrane to wrinkle.

The multi-layer collagen-based membrane should not be sterilized by E-Beam. Radiation of this nature has been shown to make the polymer mesh brittle.

Example 2

Preparation of Collagen Gel

Porcine pericardium was decellularized by standard techniques to prepare purified collagen. The collagen was micronized by cryogenic and cyclone milling, then digested in citric acid at pH 2.0-3.2. Gels were kept chilled to minimize denaturation.

For assembling multi-layer collagen-based membranes, the pH of the collagen gel was normalized back to a range of 6.8-7.2 with sodium hydroxide before using it to hydrate the membranes. If needed, phosphate sodium monobasic and sodium chloride was added.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

What is claimed is:

1. A multi-layer collagen-based membrane, comprising a bioresorbable mesh embedded between a first decellularized natural collagen-containing membrane and a second decellularized natural collagen-containing membrane, wherein the first and second decellularized natural collagen-containing membranes are cross-linked to each other by means of exposure to ultraviolet radiation in the presence of riboflavin, and the multi-layer collagen-based membrane has a peel strength at 90° of 5-250 N/m.

2. The multi-layer collagen-based membrane of claim 1, wherein the bioresorbable mesh is formed of demineralized laminar bone.

3. The multi-layer collagen-based membrane of claim 1, wherein the bioresorbable mesh is a synthetic polymer mesh, wherein the synthetic polymer mesh bestows a shape memory on the multi-layer collagen-based membrane.

4. The multi-layer collagen-based membrane of claim 3, wherein the synthetic polymer mesh is formed of a homopolymer or co-polymer that contains a polymer selected from the group consisting of polylactide (PLA), polyglycolide (PGA), polycaprolactone (PCL), poly(trimethylene carbonate) (PTMC), poly(lactic-co-glycolic acid) (PLGA), poly(lactide-co-ε-caprolactone) (PLCL), and a mixture thereof.

5. The multi-layer collagen-based membrane of claim 4, wherein the synthetic polymer mesh is formed of PLGA having a lactic acid to glycolic acid monomer ratio of 25:75 to 75:25.

6. The multi-layer collagen-based membrane of claim 1, wherein the first decellularized natural collagen-containing membrane has a fibrous side and a serosal side and the second decellularized natural collagen-containing membrane also has a fibrous side and a serosal side.

7. The multi-layer collagen-based membrane of claim 6, wherein the fibrous side of the first decellularized natural collagen-containing membrane is in contact with and cross-linked to the fibrous side of the second decellularized natural collagen-containing membrane.

8. The multi-layer collagen-based membrane of claim 6, wherein the fibrous side of the first decellularized natural collagen-containing membrane is in contact with and cross-linked to the serosal side of the second decellularized natural collagen-containing membrane.

9. The multi-layer collagen-based membrane of claim 6, wherein the serosal side of the first decellularized natural collagen-containing membrane is in contact with and cross-linked to the serosal side of the second decellularized natural collagen-containing membrane.

* * * * *